(12) United States Patent
Drapeaux (10) Patent No.: US 12,499,782 B2
(45) Date of Patent: Dec. 16, 2025

(54) TRI SPINE MODEL

(71) Applicant: DRAKE UNIVERSITY, Des Moines, IA (US)

(72) Inventor: Alisa Drapeaux, Des Moines, IA (US)

(73) Assignee: DRAKE UNIVERSITY, Des Moines, IA (US)

( * ) Notice: Subject to any disclaimer, the term of this patent is extended or adjusted under 35 U.S.C. 154(b) by 865 days.

(21) Appl. No.: 17/643,627

(22) Filed: Dec. 10, 2021

(65) Prior Publication Data

US 2022/0198960 A1 Jun. 23, 2022

Related U.S. Application Data

(60) Provisional application No. 63/199,318, filed on Dec. 18, 2020.

(51) Int. Cl.
*G09B 23/32* (2006.01)

(52) U.S. Cl.
CPC .................................. *G09B 23/32* (2013.01)

(58) Field of Classification Search
CPC ......... G09B 23/32; G09B 23/28; G09B 23/30
See application file for complete search history.

(56) References Cited

U.S. PATENT DOCUMENTS

| | | | | |
|---|---|---|---|---|
| 2,197,975 A * | 4/1940 | Fleet | ...................... | G09B 23/32 |
| | | | | 434/274 |
| 3,762,070 A * | 10/1973 | Culver | .................... | G09B 23/32 |
| | | | | 434/274 |
| 4,863,477 A * | 9/1989 | Monson | .................. | A61F 2/441 |
| | | | | 623/17.12 |
| 6,422,874 B1 * | 7/2002 | Green | .................... | G09B 23/32 |
| | | | | 434/274 |
| 2008/0318195 A1 * | 12/2008 | Murdach | ................ | G09B 23/30 |
| | | | | 434/274 |
| 2009/0162821 A1 * | 6/2009 | Boachie-Adjei | ....... | G09B 23/32 |
| | | | | 434/274 |
| 2018/0137786 A1 * | 5/2018 | Beale | ...................... | G09B 23/32 |
| 2019/0019434 A1 * | 1/2019 | Hastings | ................ | G09B 23/32 |

* cited by examiner

*Primary Examiner* — Peter S Vasat
*Assistant Examiner* — Selwa A Alsomairy
(74) *Attorney, Agent, or Firm* — McKee, Voorhees & Sease, PLC (57) ABSTRACT

A model mimicking an anatomical formation, such as a spine, can be used for teaching and practice to students and practitioners. The model includes a number of segments in the form of spinal vertebrae, which are connected to one to mimic the movement of human vertebra. The rotational movement between the segments can be adjusted frictionally to mimic human spines of varying conditions. A cavitation member is included between at least two adjacent segments to mimic a manipulation of the spinal members and to provide feedback to the user. The model can improve manual mobilization and manipulation skills within the academic or clinical setting.

19 Claims, 6 Drawing Sheets

TRI SPINE MODEL

CROSS REFERENCE TO RELATED APPLICATIONS

This application claims priority under 35 U.S.C. § 119 to provisional patent application U.S. Ser. No. 63/199,318, filed Dec. 18, 2020. The provisional patent application is herein incorporated by reference in its entirety, including without limitation, the specification, claims, and abstract, as well as any figures, tables, appendices, or drawings thereof.

FIELD OF THE INVENTION

The invention relates to the field of manual medicine, specifically physical therapy, osteopathic medicine, and chiropractic care. More particularly, but not exclusively, the invention relates to an academic and/or teaching model to improve a student or new clinician's ability to assess specific spinal conditions and improve spinal manual mobilization and/or manipulation skills.

BACKGROUND OF THE INVENTION

Health care providers who practice manual therapy within their scope of practice, including joint mobilization and manipulation, are trained within their respective graduate program generally on healthy young adults. Doctor of Physical Therapy, Doctor of Osteopathy, and/or Doctor of Chiropractic students perform their initial manual treatment techniques on young adult spines within an academic setting. As these graduate students merge into the clinical setting during fieldwork and clinical rotations, their overall confidence levels for diagnosing and performing these manual spinal techniques on pathological spines is poor. In addition, the ability for these professional students and new graduates to detect changes in mobility, pathological conditions, or changes with treatment is also minimal.

The lack of confidence and/or abilities can be attributed, at least partially, due to the lack of assessment and practice with pathological spines during graduate didactic work. For example, within graduate coursework, there is a lack of test subjects, who demonstrate spinal abnormalities like osteoarthritis. Other spinal conditions (e.g., spondylothesis) are also difficult to assess for mobility and treatment during their lab coursework due to healthy subjects only, therefore hindering professional students' development as confident new graduates when entering practice.

Thus, there exists a need for a spinal teaching apparatus that allows both diagnostic and treating techniques to be practiced prior to clinical rotations for these three disciplines (D.O., DPT, D.C.). There is a strong need to have a model that is easily manipulated repeatedly and mimics spinal arthrokinematics for both normal and pathological conditions.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the invention to improve on or overcome the deficiencies in the art.

It is a further object, feature, and/or advantage to provide an academic and/or clinical teaching model for treatment and/or diagnosis of spinal related issues.

It is still yet a further object, feature, and/or advantage to provide a teaching instrument to improve manual mobilization and manipulation skills for a spine.

The apparatus disclosed herein can be used in a wide variety of applications. For example, in clinical, academic, and/or practical settings, the apparatus can be used to diagnosis and/or treat levels of hypomobility and/or hypermobility that may be associated with medical conditions.

It is yet another object, feature, and/or advantage to provide an apparatus that is representative of true and accurate anatomical formation. For example, the anatomical formation could be vertebra of a spine. The components will represent and demonstrate realistic size and position of the formation.

It is still a further object, feature, and/or advantage to produce feedback, such as audible and/or haptic feedback related to the movement of one or more components of the apparatus.

Methods can be practiced which facilitate training, teaching, and/or practice related to the diagnosis and/or treatment of an anatomical formation, such as a spine.

According to at least some aspects and/or embodiments disclosed, an apparatus, such as a spine model, offers the ability for clinicians and/or professional healthcare students, as well as others, to enhance their manual skills with spine mobilization and manipulation. Furthermore, with varying resistance, the spine model is able to simulate both a hypomobile (e.g., osteoarthritic, post-spinal fracture) joint and hypermobility (e.g., spondylothesis). The model will allow people to enhance detection of changes in mobility, perform repetitive manual skills to improve their confidence, and practice various grades of mobilization (grade 1-5).

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the invention can be practiced are illustrated and described in detail, wherein like reference characters represent like components throughout the several views. The drawings are presented for exemplary purposes and may not be to scale unless otherwise indicated.

An artisan of ordinary skill need not view, within isolated figure(s), the near infinite number of distinct permutations of features described in the following detailed description to facilitate an understanding of the invention.

DETAILED DESCRIPTION OF THE INVENTION

The present disclosure is not to be limited to that described herein. Mechanical, electrical, chemical, procedural, and/or other changes can be made without departing from the spirit and scope of the invention. No features shown or described are essential to permit basic operation of the invention unless otherwise indicated.

Unless defined otherwise, all technical and scientific terms used above have the same meaning as commonly understood by one of ordinary skill in the art to which embodiments of the invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

Aspects and/or embodiments of the present disclosure are directed towards a spine model 10, which may also be referred to as a TRI spine model. The TRI spine model allows professional medical and graduate students to improve manual mobilization and manipulation skills within the academic or clinical setting. In addition, the model will allow a user (e.g., the student) to increase their confidence on diagnosing levels of hypomobility and hypermobility that are associated with medical conditions.

As shown throughout the figures, the model 10 model includes a plurality (five in the figures) of interconnected vertebra 22, with size, shape and arrangement representing substantially true anatomical formation. According to at least some aspects of some embodiments, the plurality of vertebra are 3D printed members comprising resin. However, the vertebra 22 of the model 10 could also be cast, molded, or otherwise formed, so long as they represent spine segments as close as possible. According to at least some embodiments, the vertebra 22 may comprise alumilite or casting resin with alumilite white resin. Each of the vertebra 22 are similar in size and shape to reduce model complexity, and when unloaded, demonstrates a form similar to anterior convex curvature of the lumbar spine. However, it should also be appreciated that the vertebra 22 used in the model 10 could take varying forms and could be different from one another, such as to indicate issues replicating the vertebra of people having various medical conditions and in different levels of health. The sizes may vary, as needed, to add to the varying teaching aspects of the model and to account for any realistic anatomy that may exist.

The model 10 includes a posterior side 24 and an anterior side 26. As with a human spine, the posterior side 24 is the side of the vertebra including the spinous process and being posterior of the spinal cord. The spinous process demonstrates realistic size and position to simulate tactual interaction. The anterior side 26 includes the vertebra body, which would normally be surrounding intervertebral discs.

The model 10 is mounted on or otherwise connected to a base 12, which includes a first vertical support 14 and a second vertical support 16. The base 12 provides a stable support for the model for lateral manipulation, and also provides appropriate fixation and flexure for proper kinematic simulation. The heights of the vertical supports can vary, and it is beneficial to have the vertebras of the model being low enough to mitigate tipping or otherwise having a high center of gravity, which will aid in the stability of the model 10. The width of the base 12 can also vary depending on the number of vertebra 22 or spine segments 20 included in the model 10. It is envisioned that more or less be included in a model and still be considered to be part of the invention. It should also be appreciated that the model could have different support configurations, such as being hung from a base or even being vertically oriented so as to replicate a human in an upright or partially upright position.

As shown in the figures, the base members (e.g., 12, 14, and 16) comprise square tubes with T-slots. The T-slots allow for connection plates between the horizontal and vertical base members, as well as between a mechanical connection 18 between a first vertebra and the vertical base 14 (i.e., the leftmost vertebra adjacent the first vertical support 14 in FIG. 1). Likewise, second vertical base 16 includes connections in the form of mechanical connections (screws and plates) that connect a spring mechanism.

On one side, the model 10 is supported via mechanical connection 18 to the first vertical connection 14. On the opposite side, a spring or other biasing member 17 is connecting the second vertical support 16 to the model. A spring connection member 19 is included as an intermediary connection. The biasing member 17, shown to be a spring in the figures, provides appropriate resistive elastic force to the model 10 during manipulation of the vertebra 22. The spring 17 will also aid in restoring the model 10 to an initial resting position after a manipulation task, as will be understood. Therefore, the spring could be adjusted or otherwise selected to provide varying amounts of resistance and bias to account for varying spine types.

The TRI spine model 10 supports loads applied in an anterior direction parallel to the sagittal plane of the vertebra (posterior-anterior mobilization). Load is applied through manual contact through the simulated spinous or transverse processes. A plurality of the vertebrae (2-3 in the figures) are able to kinematically function to demonstrate extension of the spine. The end two vertebrae are structurally fixated.

As noted in the figures, the vertebra 22 are rotatably connected to one another, such as at the vertebra connections 28. These may be in the form of variable friction hinges 30, or other friction adjustable members. The adjustable connections 30 provide simulation of the sliding friction of the synovial interfaces. Adjustment of the frictional resistance, such as by rotating a lock screw or other member to adjust the rotational friction between vertebra 22 simulates frictional resistance of synovial joints to represent differing physiological conditions, such as arthritis and the like. An acceptable, adjustable hinge can be Part No. FH100 from Sierra Pacific, but other similar types and/or manufacturers would also be acceptable and are to be considered a part of the disclosure.

Anterior adjustment members 32 are included to aid in attaching the vertebra 22 to the model 10. These member 32 are shown to be mechanical screws or bolts, and are also used for additional purposes. For example, there are elastic components to the TRI model. These are shown in the form of biasing members 34, which are used to connect adjacent vertebra 22 at the anterior member 32. The biasing members 34 are shown to be silicone O-rings, and provide simulation of the elastic stiffness of the tendons and muscle. The elasticity of the biasing members 34, such as by selection of the elasticity level of the O-rings, provides modification of stiffness gradient across vertebra 22 to illustrate physiological conditions. The elastic resistance is able to be varied to simulate the elastic stiffness of the ligaments and also allowable adjustment to resemble the hypomobility that occurs with pathological conditions (osteoarthritis). The frictional resistance of at least three of the facet joints in the model can be varied utilizing the different tension bands that come with the prototype.

According to some embodiments, the biasing members may comprise varying levels of elasticity. The biasing members may be color-coated so as to allow for identification of the varying amounts of elasticity, which makes it easier for a user to identify and set up the model for varying physiological conditions.

Additional elements of the model 10 include a cavitation assembly 40. As is known, cavitation is the popping or cracking of joints, such as via the release of air pockets or bubbles. A cavitation provides feedback that substantive manipulation of the joint has occurred. For manipulation simulation, the model 10 is able to produce an audible cavitation, which occurs with a grade 5 manipulation. This is produced when the module reaches a specific extent of displacement.

As is shown in the figures, the cavitation assembly 40 includes a cavitation plate 42, which includes a horizontal portion 44 and a vertical portion 46. The vertical portion 46 is facing an adjacent vertebra 22. The plate 42 is attached to a vertebra 22 via an adjustment member 48, which may be a screw or bolt that adjusts the plate, which mimics varying physiological conditions. A cavitation member 50 is positioned on an adjacent vertebra 22 and facing the vertical portion 46 of the plate 42. The cavitation member 50 in the figures is shown to be a suction member, which can temporarily adhere to the plate. According to some embodiments, the cavitation member 50 is a silicone suction connecter connected to the plate. This produces audible and haptic feedback similar to a cavitation, as mentioned herein.

Figure 1:
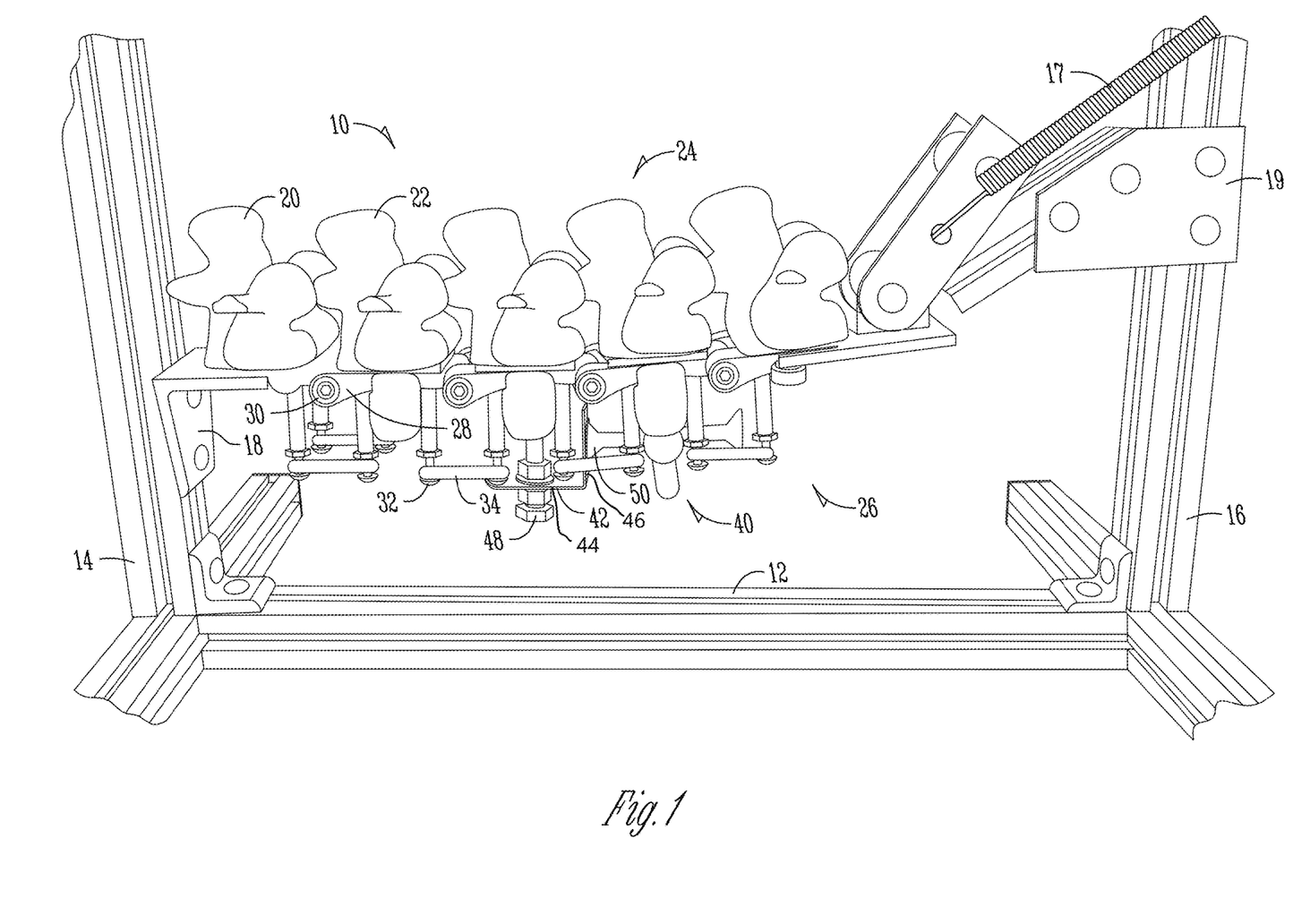
FIG. 1 is a side elevation view of a spine model according to aspects and/or embodiments as disclosed herein.
Figure 2:
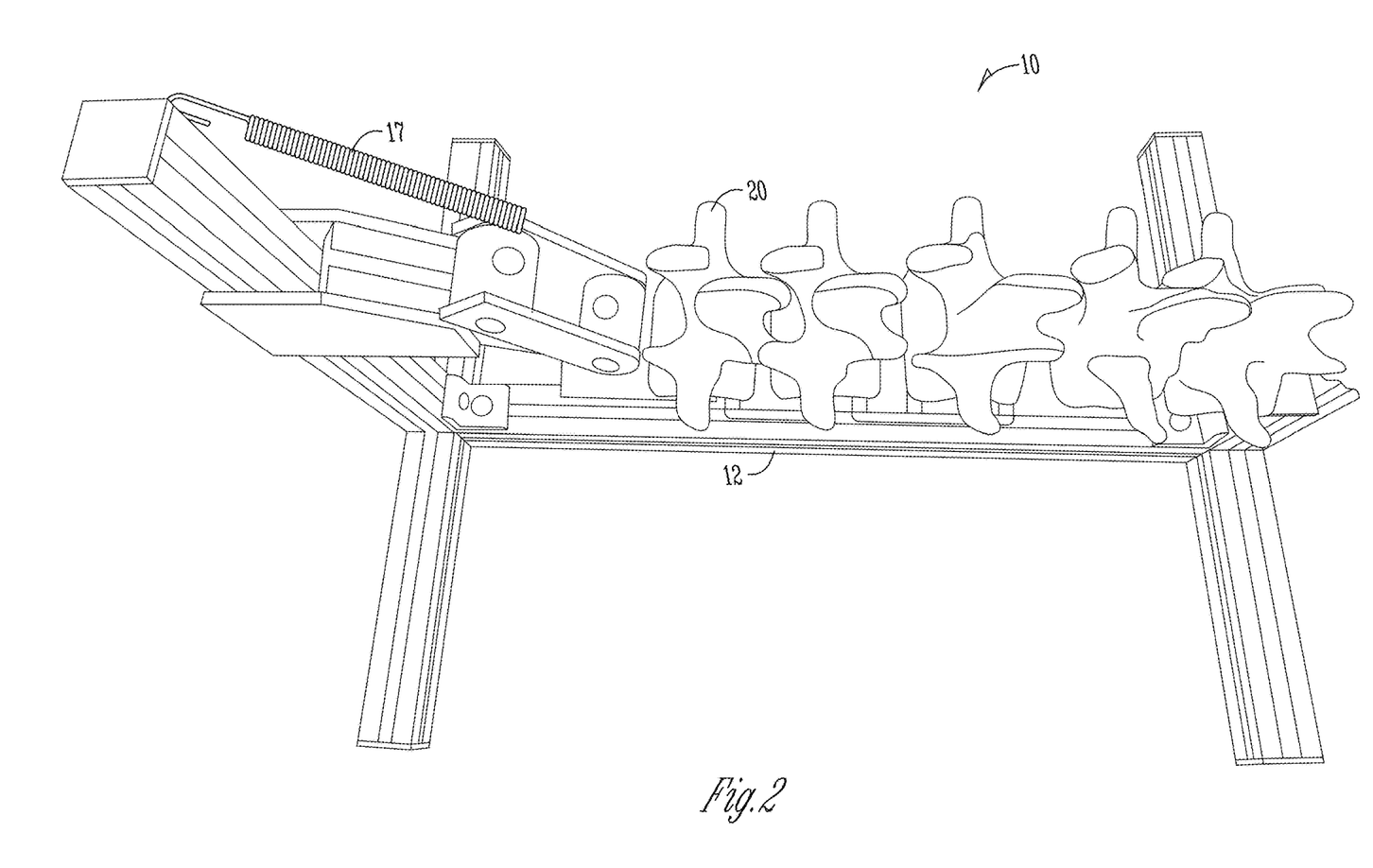
FIG. 2 is a top plan view of a spine model.

For example, the system 10 in FIG. 1 is in a resting position. This is shown in top in FIG. 2. A practitioner is able to manipulate the model 10 similar to a patient to understand the amount of force required to manipulate and/or diagnosis a physiological condition of a patient, which can be adjusted by any of the adjustment elements to mimic patients of varying age and/or physiological states.

Figure 3:
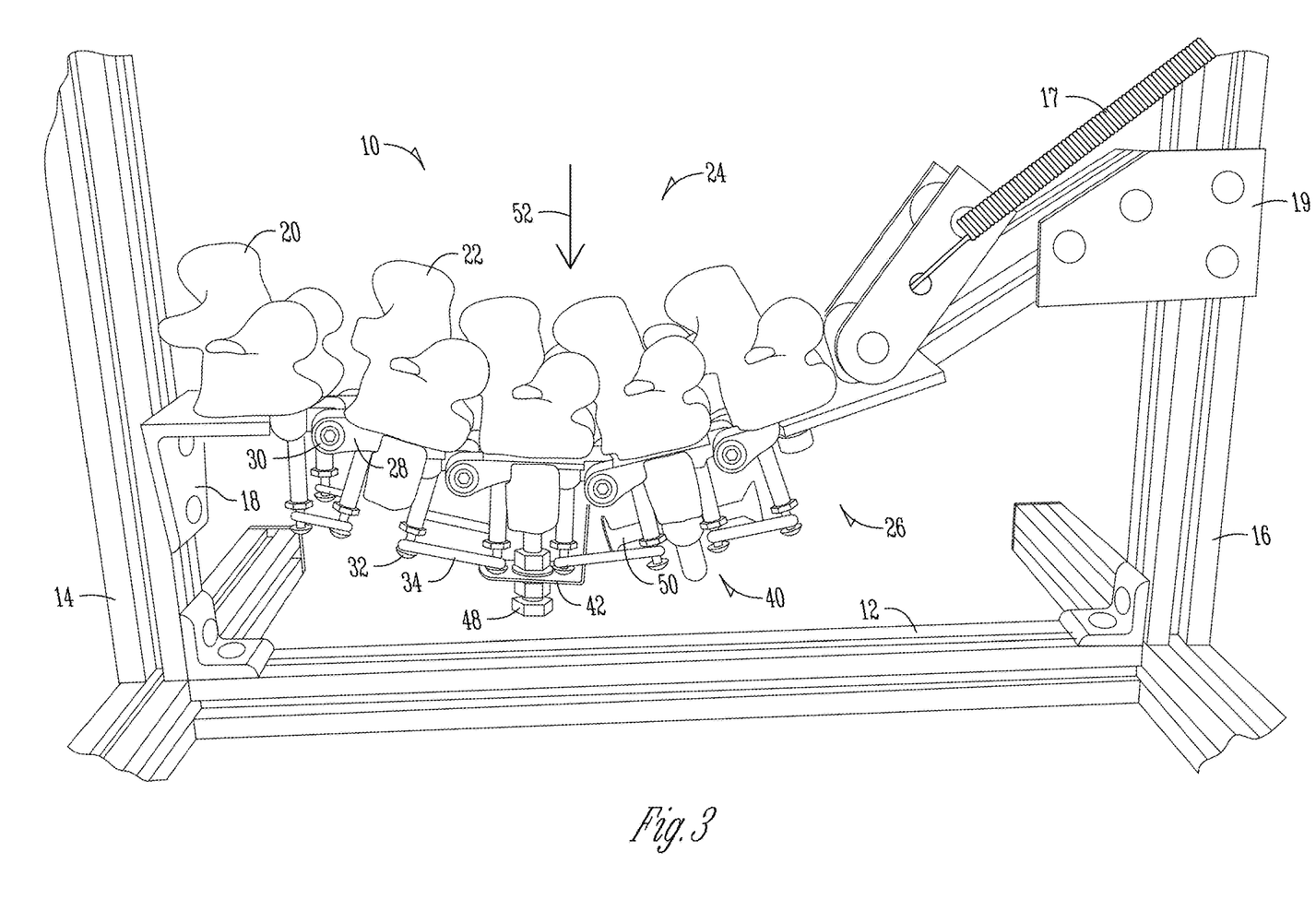
FIG. 3 is a side elevation view of a spine model being flexed to dislodge the cavitation member.

As shown in FIG. 3, a manipulation is being applied to the model. A metaphorical hand is applying a force at the posterior side in the anterior direction, such as shown by the arrow 52 in the figure. Force is applied until audible and/or haptic feedback is provided by the cavitation member 50 becoming dislodged from the plate 42. The amount of friction of the vertebra adjustment members 30, the spring 17, the biasing members 34, and any other adjustment can be made to mimic a patient of particular age and/or physiological condition. This will allow a user to practice and determine the force required to determine, i.e., diagnose or treat, a person of similar physiological condition. Upon further practice with the model, the practitioner can gain confidence for similar treatment and/or diagnosis in the real world practice.

Figure 4:
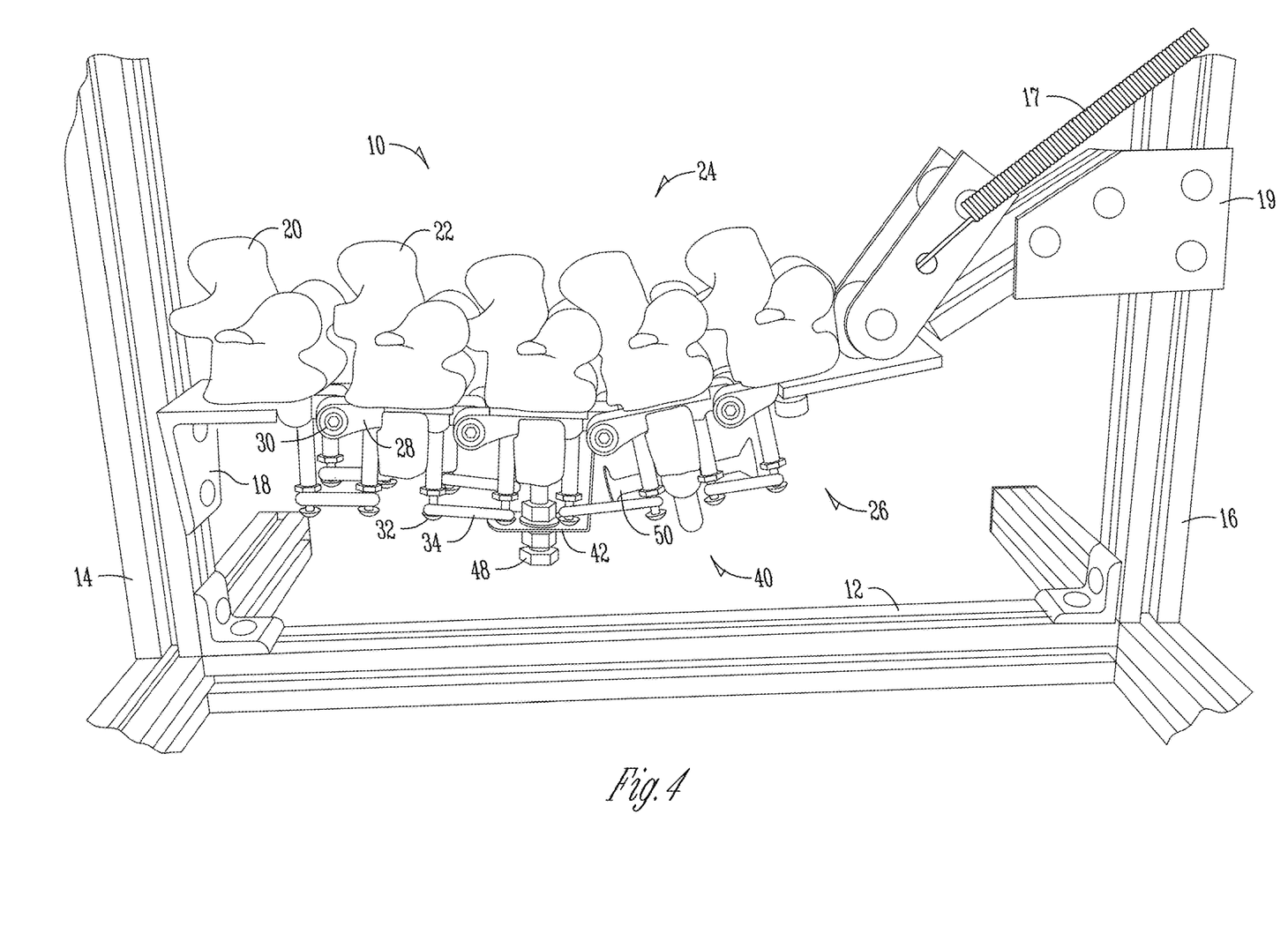
FIG. 4 is a side elevation view of the spine model in the flexed position with the cavitation member dislodged.

FIG. 4 shows the model in a flexed position after the cavitation has occurred. As shown in FIG. 4, the cavitation member 50 is still dislodged from the plate 48, which indicates that a cavitation has occurred.

Figure 5:
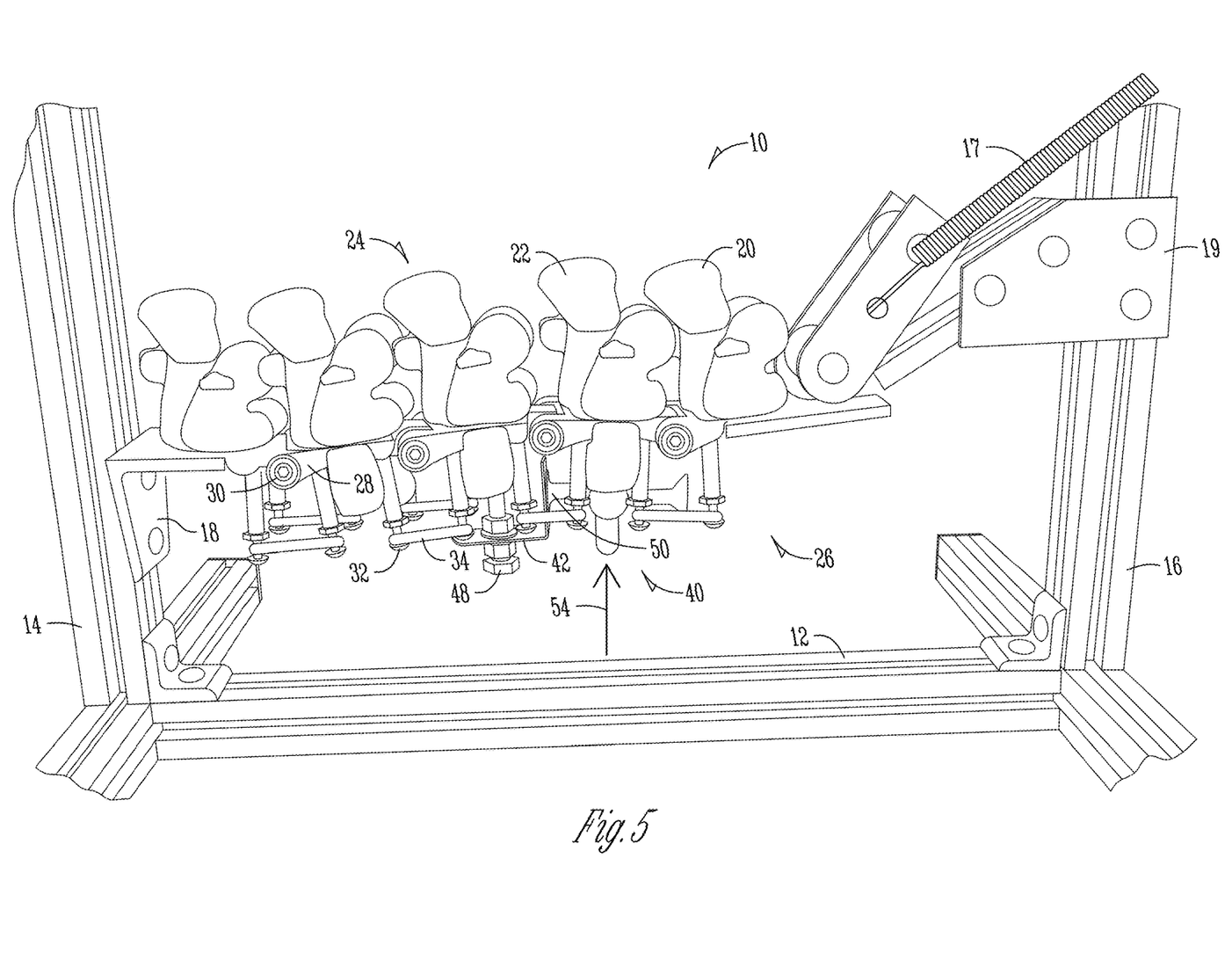
FIG. 5 is a side elevation view of the spine model in a reset position.

To reset the model 10 to a resting condition, such as that shown in FIG. 1, a force in the posterior direction can be applied, such as shown in FIG. 5. A vertebra or more are "lifted" or otherwise moved in the posterior direction as shown by the arrow 54 in FIG. 5 until the cavitation member 50 become re-adhered to the plate 42. As the cavitation member 50 is a suction element, more than just touching the plate may be necessary to provide the attachment therebetween. However, when the vertebra 22 is released, the cavitation member will be maintained in connection to the plate, which will allow the model 10 or any of the components thereof to be adjusted to set up for the next use/manipulation.

Figure 6:
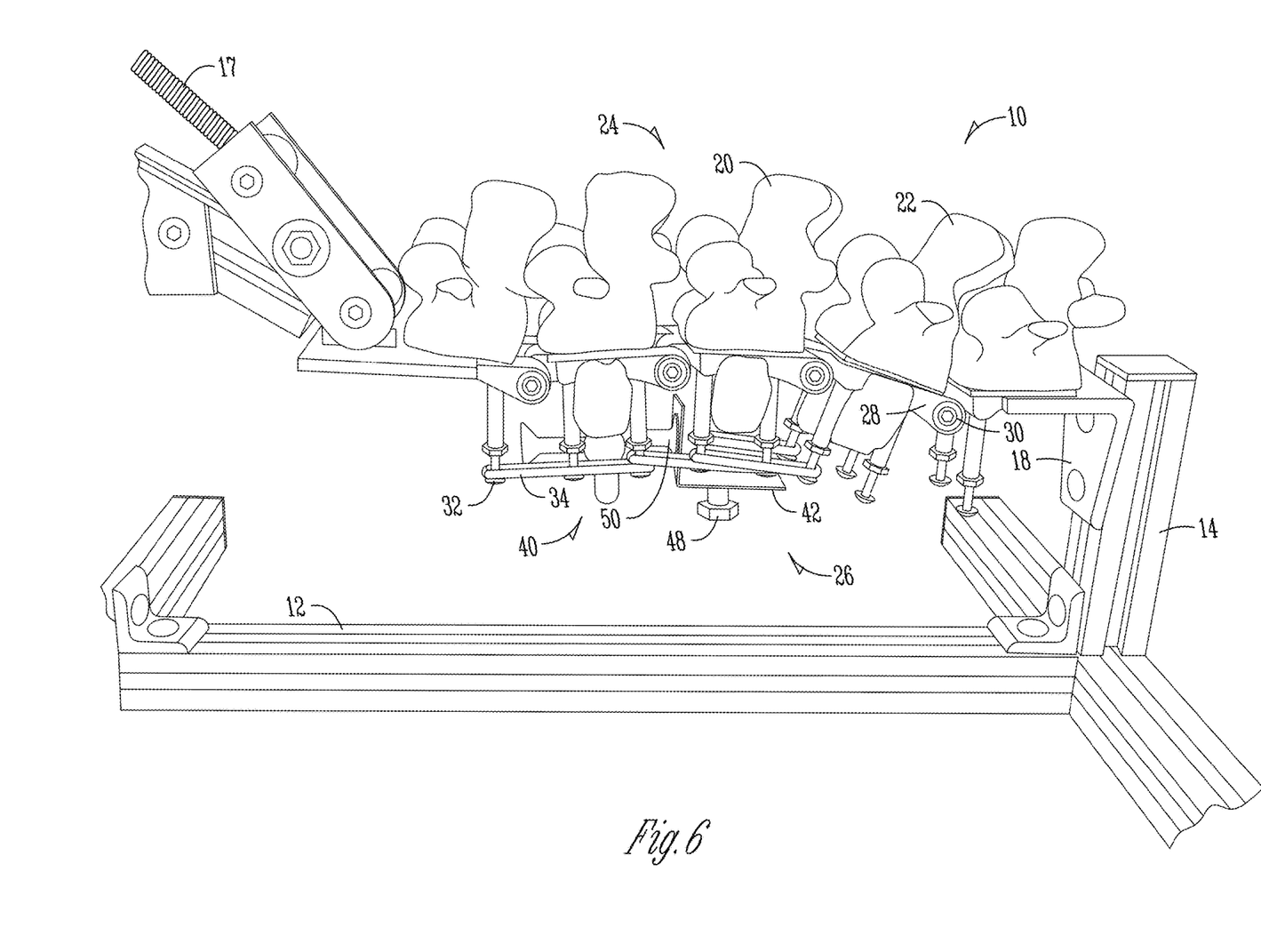
FIG. 6 is another side elevation view of the spine model showing additional aspects and/or embodiments of the components of said model.

FIG. 6 is another version or embodiment of a model 10 including many of the same components as has been shown and/or described. In FIG. 6, the biasing members 34 are shown to be overlapping, which provides for additional resistance and/or mimicking of a physiological condition for a potential patient.

The TRI spine model offers the ability for clinicians and professional healthcare students to enhance their manual skills with spine mobilization and manipulation. Furthermore, with varying resistance, the spine model is able to simulate both a hypomobile (e.g., osteoarthritic, post-spinal fracture) joint and hypermobility (e.g., spondylothesis). This model will allow students to enhance detection of changes in mobility, perform repetitive manual skills to improve their confidence, and practice various grades of mobilization (grade 1-5). Currently, no spinal anatomical model exists that can simulate a mobilization or manipulation. The TRI model allows for the clinician or medical student to enhance spinal manual skills prior to entry into the healthcare field.

In addition, the TRI model is able to be placed in a position where the practitioner or student can replicate manual treatment skills (mobilization or manipulation) in a simulated prone position. Furthermore, the student or clinician can perform the techniques with various resistances to simulate hypomobility or hypermobility conditions.

Additional components associated with the base members and other connections (screws, etc.) include, but are not limited to, steel screws for various connections, standoff collars that shield elastic bands from screw thread damage, brass thread inserts for fixation of load-bearing screws to the resin vertebral modules/segments, and elastomer foot pads for the base members to provide sufficient friction to avoid unintended model sliding during any of the manipulation tasks.

Therefore, a model has been provided that allows for the teaching and/or practice of the manipulation of a spine in a safe and accurate manner. It should be appreciated that any number of modification, variations, and/or alternative components can be made, which are within the spirit and scope of the invention. Any of the variations obvious to those skilled in the art are to be considered a part of the invention.

From the foregoing, it can be seen that the invention accomplishes at least all of the stated objectives.

The invention claimed is:

1. An anatomical teaching apparatus, the apparatus comprising:
    a model comprising a plurality of segments each representing a vertebra, said plurality of segments comprising a posterior side and an anterior side;
    said plurality of segments connected to one another with an adjustable hinge between adjacent segments, said adjustable hinge adjustable to change the friction of the adjustable hinge between a pair of connected segments; and
    a cavitation member positioned between two adjacent segments at the anterior side, said cavitation member comprising a suction member at one end connecting the adjacent segments until such a force is applied at the posterior side of the segments to disconnect the cavitation member from one of the two adjacent segments;
    wherein said model being substantially fixed at a first end and including a rotatable connection at a second end, the rotatable connection including an external biasing member between the model and a support.

2. The apparatus of claim 1, further comprising a biasing member connecting adjacent segments at the anterior side.

3. The apparatus of claim 2, wherein the biasing member providing an elastic stiffness between the adjacent segments.

4. The apparatus of claim 3, wherein the biasing member comprises a silicone band.

5. The apparatus of claim 2, wherein the biasing member urging the adjacent segments towards an unflexed position.

6. The apparatus of claim 2, wherein the external biasing member comprises a spring to provide additional stiffness to the segments of the apparatus.

7. The apparatus of claim 1, wherein the suction member extends from a first segment and towards an adjacent second segment.

8. The apparatus of claim 7, further comprising a cavitation plate connected to the adjacent second segment comprising a surface for the suction member to adhere to until such a deflection by the force at the posterior side dislodges said suction member.

9. The apparatus of claim 8, wherein the cavitation plate is adjustable to move the location of the cavitation plate relative to the adjacent second segment to adjust the amount of deflection needed to dislodge the suction member.

10. The apparatus of claim 7, wherein the suction member provides an audio and/or haptic feedback upon the force applied at the posterior side.

11. A method of operating the apparatus of claim 1, the method comprising:
    setting a desired friction at the adjustable hinges rotatably connecting the plurality of segments;
    connecting the cavitation member positioned between adjacent segments to the segments;
    applying a force at the posterior side of the segments until the cavitation member is dislodged, indicating a cavitation has occurred between the segments.

12. The method of claim 11, further comprising reconnecting the cavitation member after the cavitation has occurred.

13. The method of claim 11, wherein the force is applied until one of an audio or haptic feedback has been provided by the cavitation member.

14. The method of claim 11, further comprising adding one or more biasing members connected between two or more of the plurality of segments, wherein the one or more biasing members change the ability of the plurality of segments to rotate relative to one another.

15. The method of claim 14, wherein the one or more biasing members provide an elastic stiffness between the two or more of the plurality of segments.

16. A system, comprising:
    a base;
    a plurality of composite segments in the shape of vertebra, said plurality of segments connected to the base;
    an adjustable hinge rotationally connecting adjacent segments of the plurality of segments, wherein said adjustable hinge member is adjustable to change a rotational friction between the adjacent segments;
    at least one biasing member connecting each pair of adjacent segments; and
    a cavitation member positioned between at least two adjacent segments, said cavitation member comprising a suction member at one end for removably connecting the adjacent segments;
    wherein said system being substantially fixed at a first end of the base and including a rotatable connection at a second end of the base, the rotatable connection including an external biasing member between the plurality of composite segments and a support member at the second end.

17. The system of claim 16, wherein the biasing member provides an elastic stiffness between the segments.

18. The system of claim 16, further comprising a cavitation plate connected to one of the plurality of segments, wherein the cavitation member operably engageable with the cavitation plate to provide the removable connection therebetween.

19. The system of claim 18, wherein the cavitation plate is adjustable in an anterior direction to adjust the removable connection between the cavitation member and the cavitation plate.

* * * * *